No. 30,932.
F. W. ROBINSON.
GRAIN SEPARATOR.
PATENTED DEC. 18, 1860.
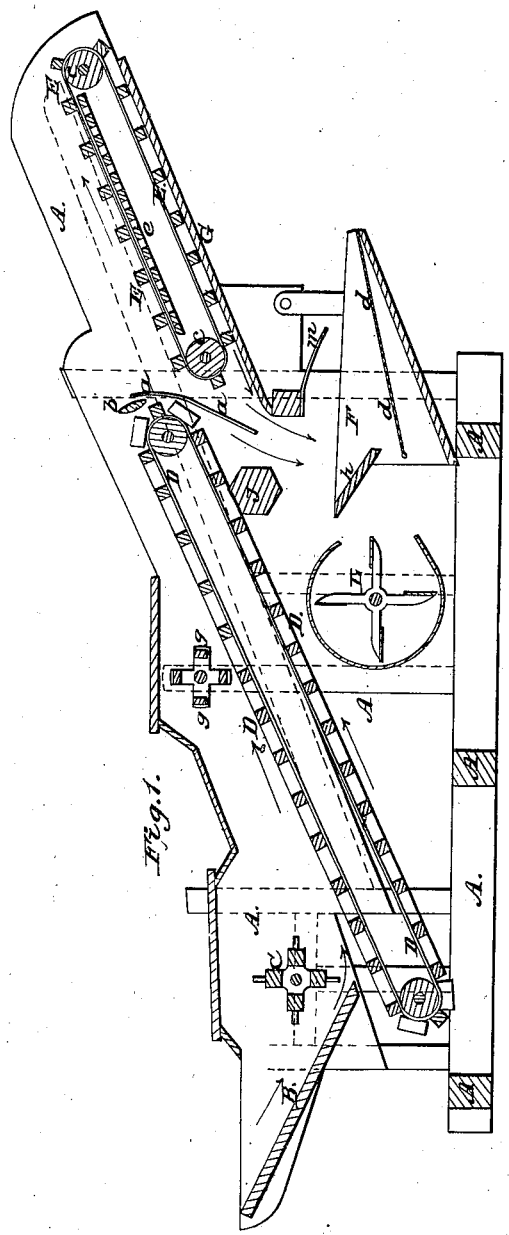
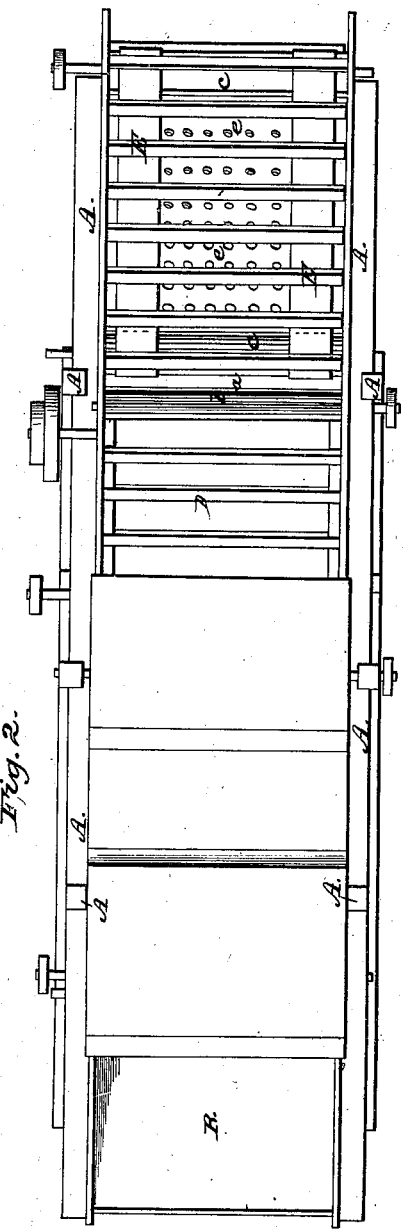
Fig. 1.
Fig. 2.
Witnesses.
Inventor.
F. W. Robinson
per Munn & Co.
Attorneys

UNITED STATES PATENT OFFICE.

F. W. ROBINSON, OF RICHMOND, INDIANA.

GRAIN-SEPARATOR.

Specification of Letters Patent No. 30,932, dated December 18, 1860.

*To all whom it may concern:*

Be it known that I, F. W. ROBINSON, of Richmond, in the county of Wayne and State of Indiana, have invented certain new and useful Improvements in Grain-Separators; and I do hereby declare that the following is a full, clear, and exact description of the same, reference being had to the accompanying drawing, forming part of this specification, in which—

Figure 1 shows a longitudinal vertical section taken through the center of the improved separator. Fig. 2 is a plan view of the complete machine.

Similar letters of reference indicate corresponding parts in both figures.

My invention and improvements in grain separators consist in arranging a grain, and a straw carrier in such a relation to each other, and to a fanning mill, both moving in the same direction, as will be hereinafter described, that a separate and independent discharge of the grain and chaff, from both carriers to the fanning mill will be effected, which will produce a uniform and continuous discharge of the grain, and prevent its choking.

The invention further consists in arranging the straw chain or carrier below the grain carrier, a suitable distance, to give a fall to the straw, from one carrier to the other for the purpose of facilitating the separation of the grain from the straw, as will be hereinafter described.

The invention also consists in arranging a stationary or adjustable inclined deflecting plate in such a relation to the shoe, and fan-mill that the blast of air is turned downward, and backward into the shoe, and drives the partially threshed heads back to be submitted to the threshing operation again, while the light chaff and other impurities pass out over the back end of the shoe in the usual manner.

To enable those skilled in the art to fully understand my invention I will proceed to describe its construction and operation.

A represents the ordinary frame for the machine.

C is a threshing cylinder; B the table over which the grain and straw are passed to the thresher C; and from the thresher it is delivered on a common cell carrier D, which carrier is operated by two pulleys around which it passes; said carrier is simply an endless belt with strips secured to its outer surface forming cells, for receiving the grain and chaff from the straw, which lie on top of the cells, and for carrying the grain upward to a common discharge which is at the upper or back end of the carrier D, as shown in Fig. 1; and at this discharging end of the grain carrier D, is arranged a division board *a*, on or against which the grain falls as it leaves the cells in carrier D, and from whence it slides by gravitation to the action of the fanning mill.

J is an agitator, arranged underneath and near the discharging end of the grain carrier D, for the purpose of shaking all the grain from the cells in this carrier at the proper place for its discharge.

*b* is a rotating shaker placed at the discharging end of the carrier D, for the purpose of shaking and throwing the straw down on to the straw carrier E. This shaker loosens and shakes the straw and greatly facilitates the separation of the balance of the grain from it, in its fall from one carrier to the other.

The straw chain, or carrier, E, is like any common open carrier, consisting of two endless belts, which pass around pulleys *c*, *c*; to which belts the slats are secured at suitable distances apart. The grain and chaff from the straw fall through this carrier, while the straw is carried up and discharged at the rear end thereof.

*e* is an inclined perforated board, arranged under the upper part of the straw carrier E; and G is a solid bottom board under the lower part of the carrier E. The grain with chaff, which is separated from the straw as it is moved off by the carrier E, falls down through the perforated board *e*, on board G, between the lower slats of E, and it is carried back by these slats and delivered at the common discharge on the rear side of division board *a*, as indicated in Fig. 1, by the arrow. The grain and chaff collected by the carrier D, and that collected by the carrier E, is in this manner brought to a common discharge from whence it falls down on the heel board *h*, of the ordinary winnowing shoe F, receiving in its fall a blast of air from the fanning mill.

L is the fan for separating the chaff from the grain, which fan is inclosed within a suitable fan case, from the mouth of which the blast is forced toward the screen *d*, and against the inclined plate *m*, which latter is arranged over the screen *d*, in such a manner that the blast is deflected downward and back, for blowing out the heavier heads which require to be re-threshed. The screen box F, is vibrated in the usual manner by a shaker.

g is a rotary beater, which is arranged at a suitable point over the carrier D, for more thoroughly beating and loosening the straw, and for shaking the carrier D.

From this description it will be seen that the grain, with chaff, which is first separated from the straw is discharged from the rear end of carrier D, toward and within the influence of the blast of the fanmill, and that the straw discharged from the carrier D, falls down upon the open carrier E, which collects the balance of the grain and chaff from the straw, and returns it to the common discharge carrying off the straw and finally discharging it at the rear end of the machine. The two carriers D and E being arranged one below the other as represented in Fig. 1, the grain will have a free discharge from both carriers while the division board a, prevents the grain from carrier D, from being thrown over onto the carrier E. This arrangement of the two carriers serves another important object, in that the straw is thrown down from the rear end of carrier D, after being loosened by the rotary shaker b, onto the straw carrier E, and the action of this shaker b, with the fall of the straw from one carrier to the other greatly facilitates the entire operation.

The grain which is discharged separately from the boards a, and G, falls down on the heel board h, thence on screen d. The chaff and light grain in this latter operation are blown out by the blast of the fan at the rear end of the screen while the heavy grain passes into a receiving box. The heavier heads are blown out by the downward current of air from the deflecting plate m, and collected for re-threshing, etc.

Having thus described my invention what I claim as new and desire to secure by Letters Patent is—

1. Obtaining a separate and independent discharge of grain from the grain carrier D, and straw carrier E, by means of a division board a, and the inclined bottom board G, the upper line of the straw carrier E, being arranged below the plane of the cellular grain carrier D, so as to obtain a fall between the carriers substantially as specified.

2. The deflecting plate or board m, arranged in the relation to the shoe F and fans L as set forth to effect the object herein stated.

F. W. ROBINSON.

Witnesses:
   Jonas W. Leo,
   John Finley.